United States Patent [19]

Wray

[11] 3,909,843

[45] Sept. 30, 1975

[54] ANALOG INFORMATION STORAGE AND RETRIEVAL SYSTEM

[75] Inventor: William R. Wray, Brookline, Mass.

[73] Assignee: Polaroid Corporation, Cambridge, Mass.

[22] Filed: Dec. 21, 1973

[21] Appl. No.: 427,105

Related U.S. Application Data

[62] Division of Ser. No. 294,486, Oct. 2, 1972, Pat. No. 3,850,513.

[52] U.S. Cl. .................................... 360/27; 360/26

[51] Int. Cl.² ........................................ G11B 5/00

[58] Field of Search ............ 360/26, 27; 178/6.6 TC

[56] References Cited

UNITED STATES PATENTS 3,666,880 5/1972 Krause ........................ 178/6.6 TC 3,761,646 9/1973 Beauviala ........................ 360/26

*Primary Examiner*—James W. Moffitt

*Attorney, Agent, or Firm*—John W. Ericson; Edward S. Roman

[57] ABSTRACT

An information storage and retrieval system in which an information signal is recorded on a record medium simultaneously with a pilot reference signal. A reproducing system is provided in which samples of the recorded information are read from the record into an analog storage register at a rate determined by the reproduced pilot signal and in a relatively fixed phase relative to the pilot signal. The samples are read out of the analog storage register at a fixed rate to compensate for differences in the speeds at which the information is stored on, and retrieved from, the record.

8 Claims, 6 Drawing Figures

ANALOG INFORMATION STORAGE AND RETRIEVAL SYSTEM

This is a division of application Ser. No. 294,486, filed Oct. 2, 1972, and now U.S. Pat. No. 3,850,513.

This invention relates to information storage and retrieval, and particularly to a novel analog information storage and retrieval system in which the effects of differences in storage and retrieval speeds are reduced.

Storage of information on a record medium by sweeping a transducer over the record medium, and the subsequent retrieval of the information by sweeping another transducer over the record medium, usually results in variations in frequency between the recorded and reproduced signals caused by instantaneous differences in the speed at which the recording and playback transducers are moved relative to the record medium. Such effects are termed wow and flutter, and are commonly encountered in tape and disk recorders. Thus, one measure of the quality of a tape recorder is the degree to which these effects have been reduced by the attainment of precise and constant tape transport speeds.

A particularly onerous frequency deviation problem is encountered in the production of sound motion pictures for which the sound track is to be recorded on the film strip. The conflicting requirements for incremental film advance from frame to frame, and constant speed of the sound track relative to the playback head, are difficult to resolve without elaborate apparatus.

One approach to this problem is to provide an incremental drive for film advance at the projection station, and a separate constant speed film drive at a remote playback station. The projection and playback stations are separated by a relatively large loop of film, and synchronized in some fashion so that the loop maintains the same constant average length, within the limits required to preserve lip synchronization between the sound track and the photographic scene. This approach obviously involves a relatively complex drive and synchronization system.

It would obviously be highly desirable to reduce the requirements for speed uniformity on signal reproducing systems of the kind described, and a primary object of the invention is to do so. A more particular object of the invention is to facilitate the production of sound motion pictures of the kind in which the sound track is recorded on the film strip.

Briefly, the above and other objects of the invention are attained by a novel signal reproduction system in which a compensator is included that derives frequency deviation information from a recorded pilot signal, and uses this information to correct the frequency of the reproduced information signal so that the original recorded signal is recreated. For this purpose, a pilot clock pulse train is derived from the recorded pilot signal. The clock pulse train so produced comprises pulses at intervals that may differ, but which represent equal time intervals in the original recording process. These signals are used to gate samples of the reproduced composite information and pilot signal into an analog storage register in a relatively fixed relation to the phase of the pilot signal.

A source of reference clock pulses is provided which consists of pulses at equal intervals that are in accordance with the intervals between the pilot clock pulses except for frequency shifts due to speed changes between recording and reproduction that appear as variations in the duration between pilot clock pulses. These reference clock pulses are used to increment the address of a location in the storage register that is connected to an output terminal.

On the output terminal appears a signal representing the contents of one address in the storage register until the next reference clock pulse, whereupon the signal is changed to repeat the contents of the next storage location in the register. This output terminal is connected through a low pass filter to any desired utilization device, such as a loudspeaker or the like, where the originally recorded information is reproduced.

Since the stored samples each contain components of the pilot signal sampled at essentially the same point in the pilot signal cycle, that component appears in the output signal as a DC bias with a low frequency ripple that will not appear in the audible output at a noticeable level. Thus, the pilot signal is effectively discarded without the need for a special filter to separate it from the information signal before the latter is sampled into the storage register.

Because it is desired to keep the total number of storage locations in the analog storage register reasonably small, persistent speed errors, or very low frequency wow deviations in frequency, would tend to cause the read-in and read-out circuits to cross over in the memory, with the result that an information jump in time equivalent to the full contents of the storage register would occur, with an abrupt transition in the output that would represent a considerable distortion of the original signal. To prevent that occurrence, an address comparator is preferably employed to detect the approach of the input and output addresses and to omit either pilot clock pulses, or reference clock pulses, until the addresses regain at least a predetermined minimum separation. In addition, if desired, a speed control mechanism for the apparatus that drives the record relative to the playback transducer can be employed, so that such low frequency errors can be reduced or eliminated.

The manner in which the apparatus of the invention is constructed, and its mode of operation, will best be understood in the light of the following detailed description, together with the accompanying drawings, of various illustrative embodiments thereof.

Figures 1, 2, 3:
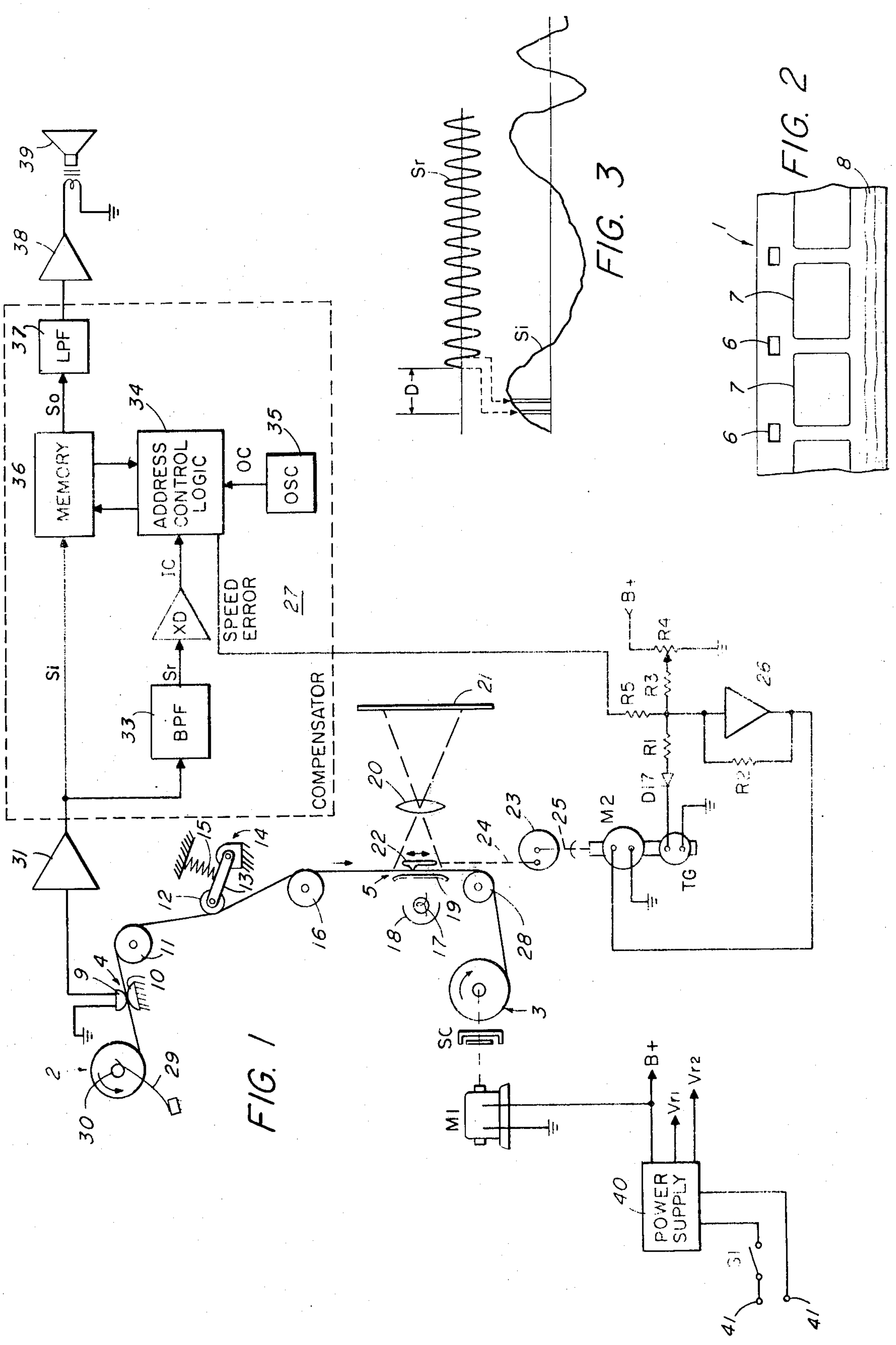
FIG. 1 is a schematic block and wiring diagram of a motion picture projection system in accordance with the invention.
FIG. 2 is a fragmentary elevational sketch, with parts broken away, showing schematically a sound motion picture film strip adapted for use in the system of FIG. 1.
FIG. 3 is a graph illustrating the relationship between typical waveforms occurring in the operation of the system of FIG. 1.

Referring to FIG. 1, there is shown a motion picture projection system which may be of conventional construction except as specifically noted. In particular, a strip of motion picture film generally designated 1 is shown extending between a supply reel 2 and a takeup reel 3 over a path through a playback station generally designated 4 and a projection station generally designated 5.

Referring to FIG. 2, the film 1 is provided along at least one edge with a series of regularly spaced sprocket holes 6 that serve in a conventional manner to cooperate with incremental drive apparatus for allowing the film to be advanced a frame at a time past the projection station 5. On the film 1 are photographically recorded frames, each comprising a photographic transparency in a motion picture sequence, which frames are adapted to be viewed by intermittent projection in sequence.

Along at least one edge of the film 1 there is a strip of magnetic material generally designated 8, such as magnetic iron oxide or the like, on which a sound track can be recorded, preferably as the film is being exposed. Alternatively, the sound track can be photographically recorded on the film and reproduced by a photosensitized pickup.

The sound track 8 cooperates with a conventional playback head 9 of the electromagnetic type for magnetic recording. The head 9 is arranged to engage the track 8 at the playback station 4, and to be urged into light engagement with the surface of the film 1 for that purpose by means schematically indicated as a resilient pressure pad 10.

The film 1 extends from the supply reel 2 through the playback station 4 just described, and thence over a first idler roll 11, and against a bobulator roller 12 journaled for rotation to a lever 13. The lever 13 is pivoted to the frame of the apparatus as suggested at 14, and is resiliently urged toward the film 1 by a spring 15.

As a frame of film is taken by the film drive pawl in a manner to be described, the spring 15 may be compressed to allow the film path to be momentarily shortened. Thus, the motion of the film past the playback station 4 can be relatively uniform.

The film 1 next passes around a fixed idler 16 rotatably mounted on the frame in the conventional manner, not shown, and thence past the projection station 5. At the projection station 5, conventional projection apparatus is provided comprising a lamp 17 provided with a reflector 18 arranged to direct a beam of light through a suitable framing aperture, not shown, in a conventional pressure plate 19. The pressure plate 19 serves to locate the focal plane of the film 1. Light transmitted through the film passes through a conventional lens system, schematically indicated at 20, onto any convenient viewing screen schematically shown at 21.

The film is arranged to be incrementally advanced past the projection station by a conventional film drive mechanism, schematically shown as comprising a drive pawl 22 connected to a crank 23 as suggested at 24. The crank 23 is arranged to be rotated by a shaft 25 driven by a conventional motor M2.

As the shaft 25 rotates the crank 23, the pawl 22 is reciprocated and oscillated in a conventional manner to engage one of the sprocket holes 6 and advance the film by one frame length, and then disengage the film and return to the position for the next feed stroke in engagement with the subsequent sprocket hole 6. This operation will be familiar to those familiar with motion picture projectors, and need not be further described.

Preferably, the speed of the motor M2 is controlled by a speed control circuit that causes a conventional amplifier 26 to drive the motor at a film speed that will maintain the sound reproduced from the track 8 at the frequency at which it was recorded. For that purpose, a tachometer generator TG may be arranged to be driven by the shaft of the motor M2, and to provide a signal repeating the actual speed of the motor M2. This signal is rectified by a diode D17 and supplied through a summing resistor R1 to the input terminal of the amplifier 26. The amplifier 26 may be provided with a conventional feedback resistor R2.

A second summing resistor R3 supplies a signal component from a petentiometer comprising a variable resistor R4 connected between a DC supply terminal at a potential B+ and ground. The supply potential at B+ is present at this terminal, and at other points to be described, when a switch S1 is closed. The switch S1 supplies energy to a conventional power supply 40 from line terminals 41. The power supply 40 also produces reference potentials $Vr_1$ and $Vr_2$, for purposes to be described.

The potentiometer R4 has an adjustable wiper that can be positioned to cause the motor M2 to be driven at a predetermined fixed speed in the absence of an error in synchronization between the speed at which the original pictures were taken and the sound recorded and the speed at which they are being reproduced.

A speed error signal for that purpose is provided by a frequency compensator 27, to be described, and applied through a summing resistor R5 to the input terminal of the amplifier 26. This signal may be positive or negative depending on the departure of the motor speed from the correct speed.

The take-up reel 3 for the film 1 is arranged to be driven by a motor M1 through a slip clutch SC. The motor M1 may be a conventional DC motor arranged to be supplied with drive current from the supply terminal at B+. The fixed speed of the motor M1 is selected to be in excess of the maximum speed of the film 1 produced by the intermittent reciprocation of the pawl 22.

The film 1 extends from the projection station 5 over an idler 28 to the take-up reel 3. Tension on the film 1 is provided by a brake, schematically indicated as a resilient arm 29 engaging the hub 30 of the supply reel 2, as well as by frictional components introduced at the playback station 4, by the idlers 11, 16 and 28, by the bobulator roller 12, and by the pressure plate 19 at the projection station. These components are designed to be sufficient that the slip clutch SC will normally slip, with the film 1 remaining stationary at the projection station 5, except when the pawl 22 advances the film and allows a frame to be taken by the supply reel.

The film 1 will thus be relatively continuously moved past the playback station 4 at a more or less uniform speed, and will be incrementally advanced at the projection station, with concommitant motion of the bobbulator roll 12 to vary the film path length with these incremental film advance strokes so that the average speed at the playback station can be maintained. The film will be taken up on the take-up reel 3 as it is advanced by the pawl 22.

It will be apparent that perfect isolation between the playback station and the projection station cannot be obtained by the mechanism just described. In particular, a strong flutter frequency component at the film projection rate, for example, from 18 to 24 cycles per second, will be introduced in this manner. Other wow and flutter components will also be present. These factors are removed by the compensator 27 in a manner next to be described.

The playback head 9 is connected between ground and the active input terminal of a conventional preamplifier 31. The active output terminal of the amplifier 31 is connected to the sampling input terminal of an analog memory 36, to be described, and to a band pass filter 33. The sound signal for the film may be recorded in a band from, for example, 100 Hz to 4,500 Hz for reasonably good fidelity. A pilot tone comprising a constant signal at 9,000 Hz may be recorded on the same track 8.

The filter 33 has a pass band sufficient to accommodate the 9,000 Hz pilot tone and its frequency deviations that may be introduced by wow and flutter, and particularly the strong component introduced by the intermittent motion of the film at the projection station 5.

The output signal from the filter 33, labeled Sr in FIG. 1, is supplied to a zero crossing detector XD, of any conventional construction, which preferably produces an output pulse at only one zero crossing of the reference signal Sr, and for example, at each positive-going zero crossing, and accordingly produces a train of clock pulses IC at the rate of 9,000 per second, occurring at a fixed point in each cycle of the pilot signal. These clock pulses IC are applied to address control logic circuits schematically indicated at 34 and to be described in more detail below.

A fixed train of clock pulses OC is provided by a local oscillator 35. The pulses from the oscillator 35 may have a fixed repetition rate of 9,000 per second, equal to the nominal repetition rate of the clock pulses IC. These pulses OC are also supplied to the address control logic circuits 34, for purposes to be described.

The uncorrected audio signal Si from the amplifier 31 is supplied to an analog memory 36, shown in block form in FIG. 1, and to be described in more detail below. The address control logic circuits 34 direct the entry of samples of the signal Si into the memory 36 in time with the clock pulses IC, and produce an output signal So that is changed in time with the clock pulses OC. As the several stages of the memory are entered by the samples Si, they are taken out in sequence to sequentially determine the amplitude of the signal So.

Feedback from the memory 36 to the address control logic circuits 34 is provided, in a manner that will be described. Should the pulses IC that read samples into the memory be too much faster or too much slower in arriving than the pulses OC, this feedback control provides for the dropping of one or more of the clock pulses IC or OC so that crossover in the memory does not occur.

The output signal So from the memory is an analog signal that remains essentially constant between clock pulses OC and then changes to a new value at each pulse OC. This signal is supplied through a low pass filter 37 to a conventional audio amplifier 38 that actuates a loudspeaker 39, or other desired utilization device.

Referring to FIG. 3, the signal Sr from the band pass filter 33 is inherently delayed in phase relative to the composite signal Si at the output terminal of the amplifier 31. This delay D may be from a part of a cycle to several cycles of the pilot signal, depending on the design of the filter. By appropriate conventional design techniques, the delay may be made equal to an integral number of cycles at the nominal frequency fr of the pilot signal. In that event, the samples gated into the memory 36 by the clock pulses IC will be taken at times at which the amplitude of the pilot signal component of the signal Si will be zero. Thus, the pilot signal will not appear in the output signal So. However, even if the samples are taken at some other point during the cycle of the pilot signal, each subsequent sample of the signal Si will contain a pilot signal component of essentially the same amplitude. The result will be a DC bias on the samples that will not appear in the AC output. Since the change in period of the pilot signal within a few cycles will be very small, even for large flutter deviations, any ripple component on this DC bias level will be at a low frequency, i.e., at the principle flutter frequency of 18 Hz and thus below the range detectable in the audio output.

In practice, it is preferred to sample at the zero crossings of the pilot signal. In that way, samples can be taken at twice the frequency of the pilot signal, whereas they could not easily be taken at more than the rate of the pilot signal if taken at other points in the cycle.

Figure 4:
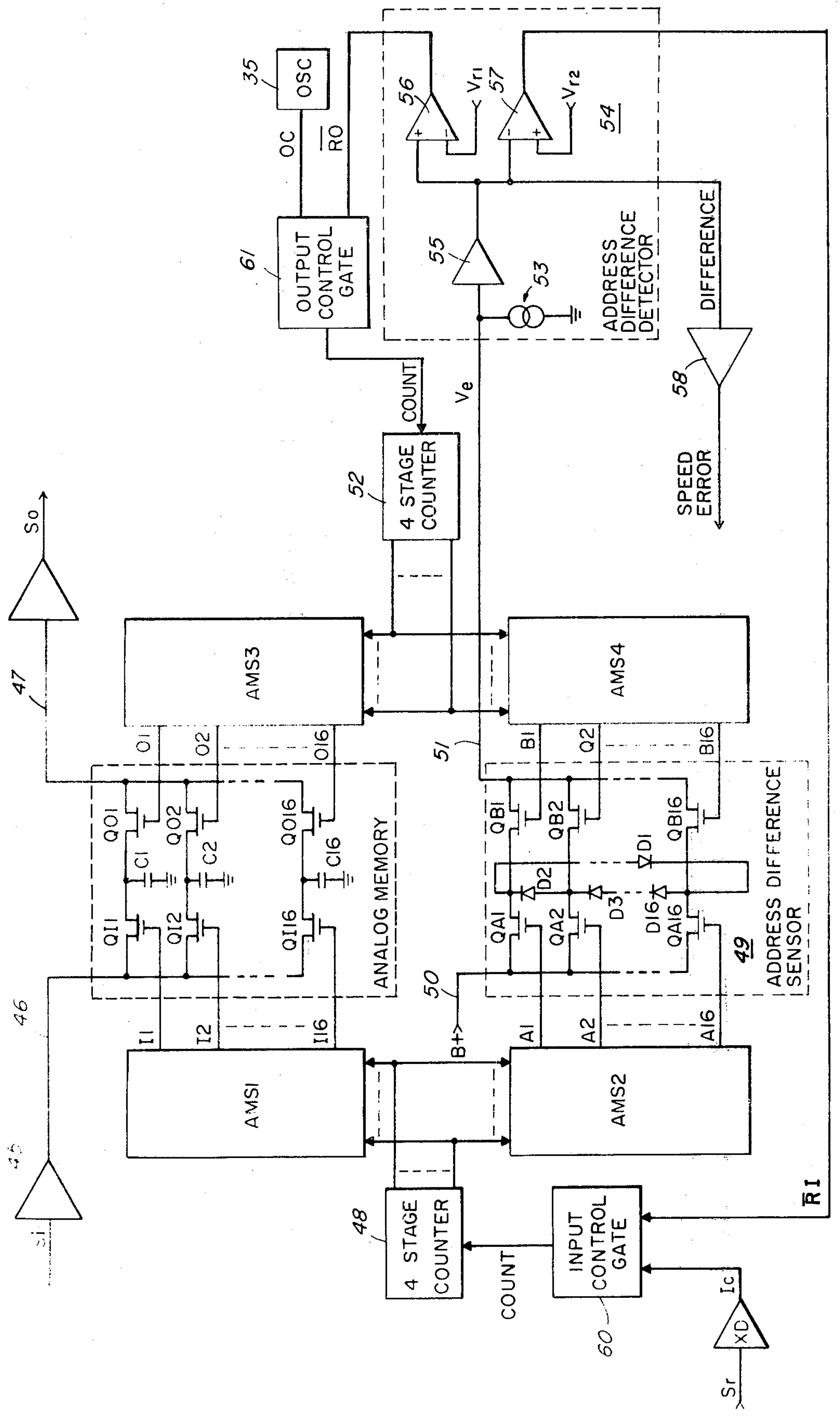
FIG. 4 is a schematic block and wiring diagram of an analog memory, and an address control system therefor, suitable for use in the apparatus of FIGS. 1 or 3.

FIG. 4 shows the analog memory and its address control circuits in more detail. The memory 36 may be a 16 stage capacitor memory addressed by field effect transistors and selected from those conventionally available units using field effect transistors manufactured by conventional MOS techniques.

The information signal Si is supplied through a conventional voltage following amplifier 45 to a lead 46. A sample of the signal on the lead 46 may be stored in any of a set of capacitors C1 through C16 in dependence on which one of a set of electronic switches, here shown as a set of 16 field effect transistors, designated QI1, Q12, etc., through QI16, is conducting. One of these transistors is selected by application of a logic 1 signal on one of a set of 16 address leads I1 through I16 to the base of the transistor to gate it into conduction and thereby supply a charging path from the lead 46 to the capacitor so selected.

A signal comprising the sample stored on any one of the capacitors C1 through C16 may be applied to an output lead 47 when the load terminals of a corresponding output switch, shown as a set of field effect transistors Q01, Q02, etc., through Q016 are rendered conductive. That is accomplished by the application of an output gate signal at logic 1, on one of a set of leads 01 through 016, applied to its base terminal.

The input address selection signals I1 through I16 are supplied by a conventional analog multiplex switch AMS1, of any conventional design, arranged to apply a logic 1 signal to one of the 16 output terminals I1 through i16 in response to a different one of a set of 16 digital codes on a set of 4 input leads and supplied from the output terminals of a four-stage binary counter 48. The counter 48 is successively advanced through its 16 states by each of a series of applied count pulses, and thus sequentially addresses the 16 stages of the memory in a cyclic sequence.

The output terminals of the counter 48 also drives a second analog multiplex switch AMS2 in synchronism with the switch AMS1. The switch AMS2 provides 16 output leads A1 through A16 which are connected to the bases of a set of 16 field effect transistors QA1 through QA16 in an address difference sensor 49.

Each of the transistors QA1 through QA16 is associated with a different one of a second set of 16 field effect transistors QB1 through QB16, and has one load terminal connected to a lead 50 on which the supply voltage at the potential B+ appears. Each of the transistors QA1 through QA16 has a second load terminal connected to one load terminal of an associated transistor QB1 through QB16. A second load terminal of each of the transistors QB1 through QB16 is connected to a lead 51, upon which a signal labeled Ve, to be described below, appears.

A diode ring, comprising 16 diodes D1 through D16, interconnects the common junctions of the transistor pairs QA and QB. Specifically, a diode D1 has its anode connected to the interconnected load terminals of the transistors QA1 and QB1, and its cathode connected to the interconnected load terminals of the transistors QA16 and QB16. Similarly, a diode D2 has its anode connected to the interconnected load terminals of the transistors QA2 and QB2, and its cathode connected to the interconnected load terminals of the transistors QA1 and QB1, and so on.

The signals 01 through 016, one and only one of which is always at logic 1 to select 1 of the transistors Q01 through Q016 for conduction, are provided by a conventional analog multiplex switch AMS3, and the energized one of the output leads 01 through 016 is selected by the digital code appearing on the four output terminals of a four stage binary counter 52. The output terminals of the counter 52 are also connected to an analog multiplex switch AMS4, which produces a logic 1 signal on one and only one of sixteen leads B1 through B16 in response to the current state of the counter 52. The counter 52 is sequentially cycled through its 16 states by count pulses applied to its input terminal.

In the operation of the apparatus, one of the transistors QI1 through QI16, and a correspondingly numbered one of the transistors QA1 through QA16, is always conducting. Similarly, one of the transistors Q01 through Q016, and a correspondingly numbered one of the transistors QB1 through QB16, is always conducting.

The conducting one of the inout transistors QI selects the memory location into which information is to be entered from the lead 46. The energized one of the output transistors Q0 selects the storage location from which information is to be read out onto the lead 47.

Thus, the conducting one of the transistors QA1 through QA16 identifies the input address, in the memory 36, and the conducting one of the transistors QB1 through QB16 identifies the output address in the memory 36. It is desired to keep these addresses apart, so that data entry does not overtake data output, or data output overtake data entry, to prevent the occurrence of a memory crossover.

The memory address difference sensor 49 provides a signal that permits this control to be accomplished. Specifically, a circuit path extends from the supply terminal at B+ over the lead 50 and through the conducting one of the transistor QA, and thence through one or more of the diodes D1 through D16 in the forward conducting direction, out through the conducting one of the transistors QB to the lead 51, and thence to ground through a conventional constant current source 53, in a functional unit identified by a dotted outline as an address difference detector 54. The voltage on the lead 51 is thus essentially B+ less the number of forward drops that are represented by the number of diodes between the load terminal of the conducting transistor QA and the load terminal of the conducting transistor QB. The constant current source 53 is included because the voltage drop through a diode in the forward direction is a function of the current through the diode, and it is desired to have these drops constant regardless of the number of conducting diodes in the circuit path.

As an examle, suppose that information was being read into address 2 and out of address 16. Thus, transistors QI2, QO16, QA2 and QB16 would be conducting. The sensing circuit path would thus extend from the lead 50 through the load terminals of transistor QA2, through the diodes D2 and D1 in series, and through the load terminals of the transistor QB16 to the output lead 51. Two forward diode gaps, in addition to two field effect transistor load terminal gaps, would thus separate the potential of the lead 51 from the supply potential at B+. If the output address was changed from 16 to 1, transistors QO1 and QB1 would be rendered conducting, and in that case only the diode D2 would separate the potential supplied by the transistor QA2 from the potential received by the output transistor QB1.

The address difference signal Ve appearing on the lead 51 is applied to a buffer amplifier 55. The output signal from the amplifier 55 is applied to a first voltage comparator comprising an operational amplifier 56. The signal from the amplifier 55 is applied to the non-inverting input terminal of the amplifier 56.

A first reference voltage $Vr_1$, from any suitable source of reference potential, that is slightly less than one forward diode gap less than the supply potential at B+, is applied to the inverting input terminal of the amplifier 56. The amplifier 56 is arranged to produce a logic 1 signal labeled $\overline{RO}$ when the diode path from the selected input transistor QA that is currently conducting to the output transistor QB that is currently conducting is one forward diode gap or less. If there are more diodes in this path, the signal from the amplifier 56 will be 0.

For example, if the input address was 2, with transistor QA2 conducting, and the output address was 1 or 2, it would be desired to hold the output address while the input address advances to prevent a crossover. Under these conditions, the signal $\overline{RO}$ would be produced.

The signal from the amplifier 55 is also applied to the inverting input terminal of a second operational amplifier 57, which also serves as a comparator, in this case serving to produce a signal that is at a logic 1 level, labeled $\overline{RI}$, when there are at least 15 diode forward gaps between the conducting transistor QA and the conducting transistor QB. For this purpose, a second reference voltage $Vr_2$ is applied to the non-inverting input terminal of the amplifier 57. When the signal $\overline{RI}$ is produced, the input address is not allowed to advance until the output address has been advanced to remove the signal $\overline{RI}$.

The voltage at the output of the amplifier 55 represents the difference between the input and output addresses in terms of a voltage which fluctuates between a value proportional to B+ minus one forward diode gap to a value proportional to B+ minus fifteen forward diode gaps. This difference signal is applied to a conventional amplifier 58 to provide a speed error signal that is bipolar and properly scaled to adjust the speed of the motor M2 in FIG. 1 in a direction to tend to maintain the address difference at the central point in the allowable range.

The signal $\overline{RI}$, together with the clock pulses IC from the zero crossing detector XD, are applied to an input control gate 60 which provides COUNT pulses, in a stream corresponding to the clock pulse stream IC, except that when a signal $\overline{RI}$ is present, a pulse is deleted from the count pulse stream. The input control gate 60 will be described below in more detail in connection with FIG. 5.

Similarly, the signal $\overline{RO}$ from the address difference detector 54 is supplied to an output control gate 61, together with the clock pulses OC from the oscillator 35. The control gate 61 supplies COUNT pulses to the counter 52, one for each pulse OC, except that when the signal $\overline{RO}$ is present, a pulse is deleted from the COUNT pulse stream.

Figure 5:
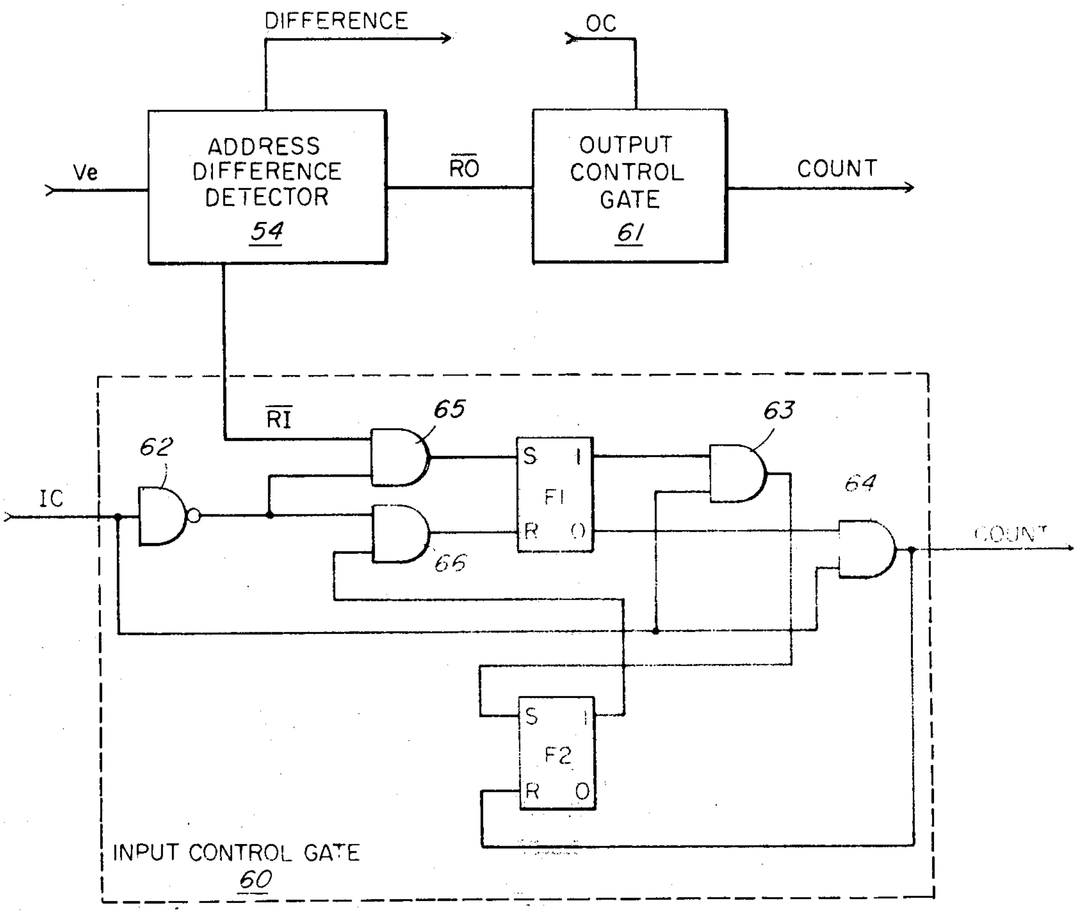
FIG. 5 is a schematic block and wiring diagram of portions of the control circuit shown in block form in FIG. 4.

FIG. 5 shows the details of the input control gate 60. The output control gate 61, which may be identical in construction, may be assumed to operate in the same manner as will be described for the gate 60.

As shown, the clock pulses IC are applied to a conventional NAND gate 62, which serves as an inverter, and to one input terminal of each of two conventional AND gates 63 and 64. The gate 62 thus produces a logic 1 output signal at its output terminal when, and only when, the clock pulses IC are absent. The gates 63 and 64 produce logic 1 output signals when a clock pulse is present and their second output terminals, connected in a manner to be described, are at logic 1.

The output signal from the gate 62 is applied to one input terminal of each of two AND gates 65 and 66. The second input terminal of the gate 65 receives the signal $\overline{RI}$ from the difference detector 54. The second input terminal of the gate 66 is connected to the logic 1 output terminal of a conventional flip-flop F2. This terminal is at a logic 1 level when the flip-flop F2 is set in a manner to be described.

When the gate 65 produces a logic 1 output signal, a flip-flop F1 is set. When set, a logic 1 signal appears at the logic 1 output terminal of the flip-flop F1 to enable the gate 63, so that the gate 63 will produce a logic 1 output signal at the next clock pulse IC. This logic 1 signal from the gate 63 sets the flip-flop F2.

A logic 1 output signal at the logic 1 output terminal of the flip-flop F2 enables an AND gate 66 to reset the flip-flop F1 when the clock pulse that caused the flip-flop F2 to be set disappears.

The logic zero output terminal of the flip-flop F1 is connected to the second input terminal of the gate 64. Thus, when the flip-flop F1 is reset, and a clock pulse IC appears, a COUNT pulse is produced. This COUNT pulse is applied to reset the flip-flop F2.

Figure 6:
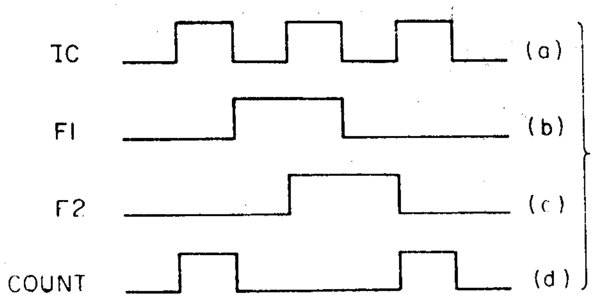
FIG. 6 is a composite timing diagram illustrating the operation of a portion of the apparatus of FIG. 5.

Referring to FIG. 6, a typical operating sequence is shown, which assumes that both flip-flops F1 and F2 are reset, and that the signal $\overline{RI}$ is initially absent. The states of the flip-flops are represented as low when they are reset, and high when they are set, in FIGS. 6*b* and 6*c*. The clock pulses IC, and the COUNT pulses, are shown as high when present and as low when absent.

As the first clock pulse IC is produced with the flip-flop F1 reset, the gate 64 produces a COUNT pulse. Assume that this COUNT pulse causes the address difference detector 54 to produce the signal $\overline{RI}$. When the clock pulse IC disappears, the gate 65 will accordingly set the flip-flop F1, enabling the gate 63 and disabling the gate 64.

When the next pulse IC appears, the gate 64 will not produce a COUNt pulse, but the gate 63 will produce a logic 1 output signal to set the flip-flop F2. As a COUNT pulse has been omitted, and because the input clock and output clock frequencies are maintained relatively close together, an output COUNT pulse will occur sometime during the interval between the end of the first clock pulse IC and the end of the second clock pulse IC. That will cause the signal $\overline{RI}$ to disappear.

Assume that the next clock pulse OC occurs before the end of the second clock pulse IC. That will cause the level $\overline{RI}$ to be removed, disabling the gate 65. When the pulse IC disappears, with the flip-flop F2 set, the gate 66 will reset the flip-flop F1. The gate 64 will then be enabled.

The next clock pulse IC will thus be passed by the gate 64 as a COUNT pulse, and this COUNT pulse will reset the flip-flop F2. It is apparent that the result is to delete a COUNT pulse in response to the presence of the signal $\overline{RI}$. The output control gate 61 may be connected in an identical manner, to delete output COUNT pulses in response to the presence of the signal $\overline{RO}$.

While the invention has been described primarily with respect to the details of a particular motion picture sound system, it will be apparent to those skilled in the art that the apparatus is adaptable to the correction of frequency deviations in other analog information storage and retrieval systems, and in other frequency domains. The only requirements are that the information contained in the signals to be compensated be somewhat redundant, as control is affected by discarding samples, or by repeating samples, in order to keep the size of the memory down. The sampling rates must be high enough to allow this to be done without noticeably distorting the output. Within these limitations, it will be apparent that the invention has wide application to the correction of frequency deviations in reproducing recorded signals.

The overall operation of the system of the invention will in general be apparent from the above description. However, referring to FIG. 1, operation of the system will be briefly reviewed. It is assumed that a strip of movie film 1 of the type shown in FIG. 2, on which a series of photographic transparency frames 7 have been photographed and developed, and on which a sound track 8 has been recorded with the sound to accompany the pictures and the reference tone described, is threaded between the supply reel 2 and the take-up reel 3. Next, assume that the switch S1 is closed to supply power at the potentials B+, $Vr_1$ and $Vr_2$ to the apparatus.

The motor M1 will commence to run, with attendant slippage of the clutch SC to apply tension to the film 1. The motor M2 will operate, with its speed under the control of the speed error signal from the compensator 27 applied to the control network for the amplifier 26. The speed of the film will accordingly be maintained near the desired average value.

The crank 23 will cause the pawl 22 to intermittently advance the film, resulting in an average speed at the playback station 4 that will fluctuate by a flutter component. The reproduced audio signal will be supplied through the amplifier 31 to the memory 36 and to the filter 33 in the compensator 27.

Samples of the information signal Si will be read into the memory 36 under the control of the clock pulses IC, at the rate at which positive-going zero crossings in the reference signal are read back from the tape. Samples will be read out of the memory to form the output signal SO, which will be changed at the rate of the clock pulses OC from the oscillator 35, at a rate centered in the range of the rates of occurrence of the pulses IC.

When the pulses IC occur more rapidly than the pulses OC, the input memory address will move closer to the output memory address, until the detection point at which the comparator 57 in FIG. 4 is actuated to produce the signal $\overline{R}$I. That will cause sampling in to be interrupted. In effect, an input sample will be discarded to allow the output to catch up.

On the other hand, if the input pulses occur more slowly than the output pulses, the input address will move toward the output address in the opposite direction, until the comparator 56 in FIG. 4 responds to produce the signal $\overline{R}$O. That will inhibit the change of the output memory address for one count, allowing the input address sampling to catch up. Since the input samples are taken at times corresponding to equal time intervals during recording, and the output samples are taken at the constant intervals established by the output clock pulses, the information will be restored to the original recorded frequency, except as it is temporarily rephased as the memory tends to overflow in either direction.

It has been found by experiment that a 16 stage memory compensates for fairly extreme conditions of violent flutter such as those encountered in a movie projector at 18 frames per second without distortion appreciable to the ear. The output signal So applied through the low pass filter 37 and the amplifier 38 to the loud speaker 39 will accordingly produce the recorded frequency accurately. A particular advantage of the system is that, by relaxing the requirements on the uniformity of the film speed at the playback head, the bobulator roller 12 can effect sufficient isolation between the playback station and the projection station with only small changes in the length of the film path between those stations. Accordingly, lip synchronization is preserved without any additional apparatus.

While the invention has been described with respect to the details of various illustrative embodiments, many changes and variations will occur to those skilled in the art in reading this description. Such can obviously be made without departing from the scope of the invention.

Having thus described the invention, what is claimed is:

1. Apparatus for compensating the information component of a composite signal in which an information signal that has been recorded and reproduced simultaneously with a reference signal are combined, comprising filter means responsive to said composite signal for producing a timing signal at the frequency of said reproduced reference signal, a storage register having the capacity to store a plurality of samples of a signal, means controlled by the timing signal for storing samples of the composite signal in said register at a rate equal to the frequency of the timing signal and in fixed phase relation to the timing signal, an output terminal, and means for applying samples stored in said register to said output terminal at a second rate in the sequence in which they were stored.

2. The apparatus of claim 1, further comprising means for removing each sample from the memory as the next sample in the storage sequence is applied to said output terminal, and means for discarding a sample when to store a new sample would exceed the capacity of said register.

3. A wideband compensator for removing frequency shifts from an analog signal superposed on a reference signal having analogous frequency shifts from an initially periodic waveform to form a composite signal, comprising filter means responsive to said composite signal to reproduce said reference signal, a storage register, first means for gating samples of said composite signal into said register at the frequency of said reproduced reference signal, an output terminal, and second means for applying samples stored in said register to said output terminal at a predetermined rate and in the order in which they were stored to produce an output signal on said terminal.

4. the apparatus of claim 3, further comprising means for inhibiting the operation of said first means when said register is full.

5. Apparatus for compensating an information signal recorded on a record in superposition with a periodic reference signal as a composite signal, comprising means for reproducing said composite signal, filter means responsive to said composite signal for reproducing said reference signal, signal genereating means for producing a periodic gating signal having a period equal to the period of said referencesignal when recorded, a storage register having a predetermined capacity for the storage of samples of a signal, first means controlled by said reproducing means and said filter means for gating samples of said reproduced composite signal into said register at a rate inversely proportional to the instantaneous period of said reproduced reference signal, an output terminal, second means controlled by said signal generating means and responsive to said gating signal for gating samples stored in said register to said output terminal in the order in which they were stored at a rate inversely proportional to the period of said gating signal, and inhibiting means for inhibiting the gating of a sample into said register when the number of samples gated into said register exceeds the number of samples gated to said output terminal by a number determined by the capacity of said register.

6. Apparatus for reproducing an information signal recorded on a record in superposition with a simultaneously recorded constant frequency pilot signal, comprising transducer means, drive means for receiving the record and moving the record relative to said transducer means to reproduce a composite signal having said information signal and said pilot signal as components, a band pass filter connected to said transducer means to produce a timing signal at the frequency of the pilot signal component of said reproduced composite signal, memory means, sampling means responsive to said transducer means and controlled by said timing signal for storing a sample of said composite signal in said memory means once for each cycle of said timing signal at the same point in each cycle, a low pass filter, means for producing an output timing signal at the constant frequency at which said pilot signal was recorded, and means responsive to said output timing signals for supplying a sample from said memory means to said low pass filter once for each cycle of said output timing signal.

7. The apparatus of claim 6, further comprising means responsive to the frequency difference between said timing signals for controlling said drive means to reduce said difference.

8. Apparatus for extracting an information signal from a composite signal comprising the sum of said information signal and a reference signal while compensating said information signal for frequency shifts analogous to frequency shifts that the reference signal has experienced from an initially constant frequency, comprising a low pass filter adapted to receive said composite signal and produce a first control signal at the frequency of said reference signal in said composite signal, storage means responsive to said first control signal for storing samples of said composite signal at the rate of one for each cycle of said first control signal, means for producing a second control signal at said initial constant frequency, a low pass filter, and means responsive to said second control signal for extracting samples from said storage means and applying them to said low pass filter once for each cycle of said second control signal.

* * * * *